(12) United States Patent
Benini et al.

(10) Patent No.: US 7,042,993 B2
(45) Date of Patent: May 9, 2006

(54) METHOD FOR FLEXIBLE CHARGING OF FEES FOR SERVICES AND RESOURCES IN NETWORKS

(75) Inventors: Giovanni Benini, Watertown, MA (US); Andreas Kalkbrenner, München (DE); Andreas Mayerhofer, Korneuburg (AT); Rainer Stademann, Berg (DE); Rudolf Stelzl, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 19 days.

(21) Appl. No.: 10/451,335

(22) PCT Filed: Dec. 18, 2001

(86) PCT No.: PCT/EP01/14937

§ 371 (c)(1),
(2), (4) Date: Apr. 22, 2004

(87) PCT Pub. No.: WO02/052832

PCT Pub. Date: Jul. 4, 2002

(65) Prior Publication Data

US 2004/0202297 A1   Oct. 14, 2004

(30) Foreign Application Priority Data

Dec. 22, 2000   (EP) ................................. 00128350

(51) Int. Cl.
*H04M 15/00*   (2006.01)
(52) U.S. Cl. ............ 379/114.22; 379/120; 379/121.01; 379/127.05
(58) Field of Classification Search ................ 455/405, 455/406; 379/121.01, 114.22, 114.21, 115.02, 379/121.02, 127.03, 127.05, 120, 115.01; 380/247, 257, 270
See application file for complete search history.

(56) References Cited

U.S. PATENT DOCUMENTS

| 4,393,269 | A | 7/1983 | Konheim et al. |
| 5,381,467 | A | 1/1995 | Rosinski et al. |
| 5,504,837 | A | 4/1996 | Griffeth et al. |
| 6,430,279 | B1* | 8/2002 | Sawatzki et al. ...... 379/144.01 |

FOREIGN PATENT DOCUMENTS

| EP | 0 825 787 A1 | 2/1998 |
| JP | 7-307814 | 11/1995 |

OTHER PUBLICATIONS

R. Kishimoto, "Distributed Cooperative Multiagent Model For Intelligent Telecommunication Networks," Electronics and Communications in Japan, Part 1, vol. 74-B-1, No. 11, pp. 919-930, Nov. 1991.
IB-00/38403-A1, Jun. 29, 2000.
IB-00/28452-A1, May 18, 2000.

* cited by examiner

Primary Examiner—Rexford Barnie
(74) Attorney, Agent, or Firm—Morrison & Foerster LLP

(57) ABSTRACT

In current telecommunications services, it is usual for the service provider of the initiator (e.g. the caller or the A-side) of the communications connection to determine the price and charge the A-side accordingly. The other subscribers are not usually charged. The A-side service provider pays a compensation amount (balance) to the B-side service provider. This fee charging and payment system is too rigid for modern communications services. The inventive method solves this problem.

5 Claims, 1 Drawing Sheet

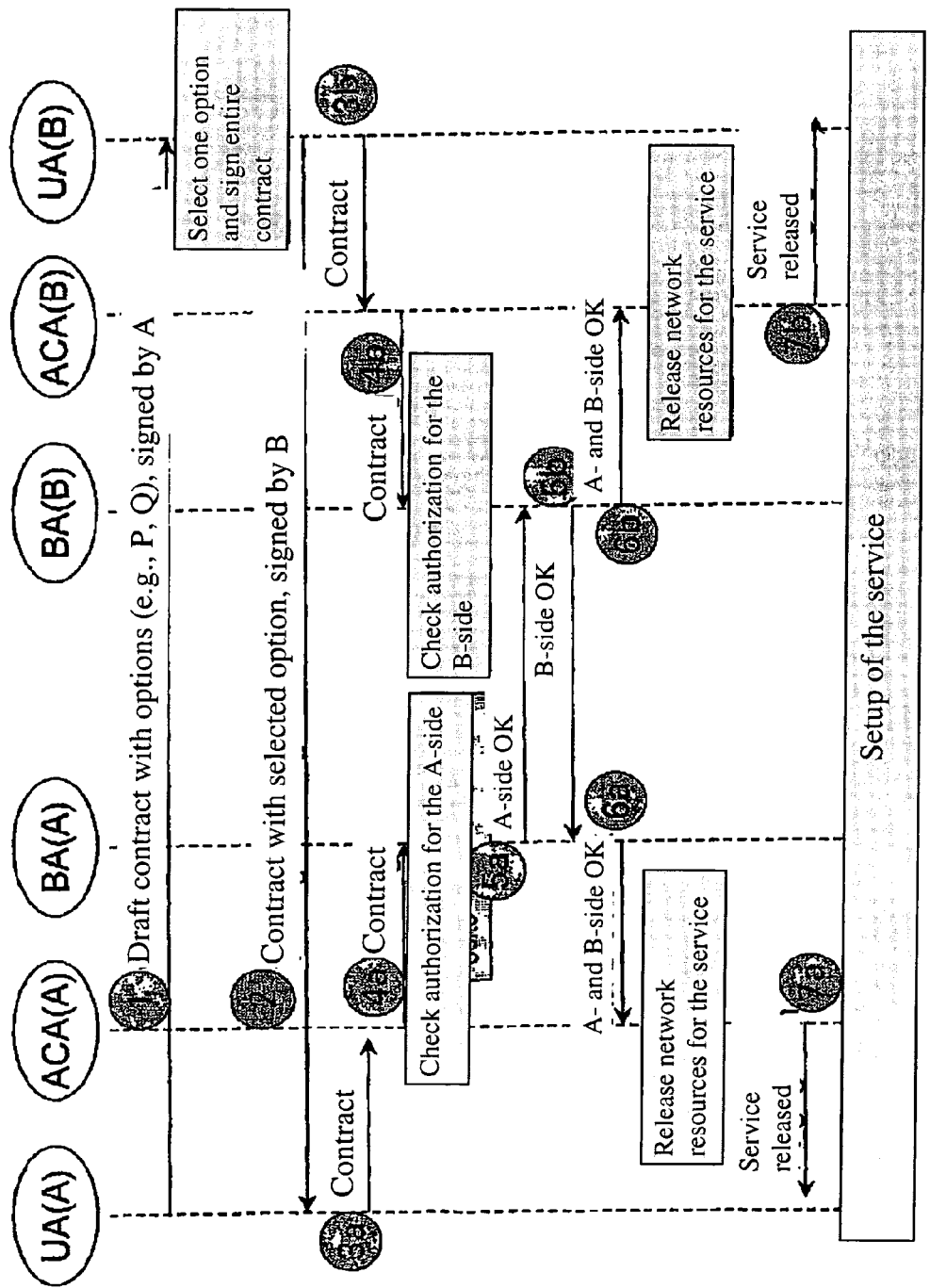
Figure

METHOD FOR FLEXIBLE CHARGING OF FEES FOR SERVICES AND RESOURCES IN NETWORKS

CLAIM FOR PRIORITY

This application claims priority to PCT/EP01/14937, published in the German language on Dec. 18, 2001, which claims the benefit of priority to German application no. 00128350.6, filed in the German language on Dec. 22, 2000.

TECHNICAL FIELD OF THE INVENTION

The invention relates to a method for flexible charging of fees for services and resources in a network.

BACKGROUND OF THE INVENTION

Telecommunications services are usually offered by several service providers. For example, such a service may be used in order to set up a communications connection between several users (e.g. a telephone conversation between mobiles or a multimedia session between two or more terminals or PCs). In this case, each subscriber may have concluded a contract with a different service provider. In current services it is usual for the service provider of the initiator (e.g. the caller or the A-side) of the communications connection to determine the price and charge the A-side accordingly. The other subscribers are not usually charged. The A-side service provider pays a compensation amount to the B-side service provider, which is determined by bilateral agreements that are additionally subject to regulation (billing).

This fee charging and billing system is too rigid for modern communications services, for example for video telephony, where—for example—a video channel may be subsequently added to or removed from the audio channel not only by the A-side, but also by the B-side. In addition, it is also useful to have a unidirectional video stream in parallel to the bidirectional audio stream. A more flexible fee charging system must permit fees to be charged on both the A-side and the B-side. For example, the B-side may be charged for a video stream by its service provider even if the audio stream has been set up and paid for by the A-side. It is also conceivable that the A-side and B-side may wish to share the communication costs, e.g. both paying for the outgoing unidirectional streams. This means that the fee charged may be different for each call.

Furthermore, in modern communications architectures the network operator often makes only the raw network resources available, while the actual communications services are provided by the service provider (separation of network and service providers). In this case, several network operators and several service providers may be involved when a communication service is used. The income received from the users must then be shared between the network operators and service providers involved (billing problem).

The fee charging problem is solved only to a very limited extent using conventional communications networks. For example, IN architecture permits more flexible fee charging for special services (freephone, premium rate, etc.). This flexibility is at the cost of complex protocols yet is nevertheless inadequate for a multimedia communication service.

The billing of services within and between the operators and providers is done mainly by generating data records for each call. These contain—among other things—only call data, but no information about allocation of costs between the service users. Calls with unusual cost allocation (e.g. collect calls) must be processed in other ways, including manually by call centers.

SUMMARY OF THE INVENTION

A one embodiment of the invention, the negotiation of a cryptographically signed contract between the users of a communication service, in which the payment for this service is specified by the users with regard to the service provider(s) involved, such that this contract can by used by the service providers and network operators as the basis for billing for the service and network provision. The electronic procedures for the cryptographic signature of messages (e.g. e-mails) are the prior art. The invention describes how such methods can also be used for flexible fee charging and billing for communication services.

In one embodiment of the invention, there is a method for charging of fees for communication services with several service providers. The method includes, for example, defining an allocation of costs incurred for use of one of the communication services between the service providers by users involved in the communication service and/or respective IT representatives negotiating a contract for the allocation of the costs; documenting the contract in electronic form; and cryptographically signing the electronic form of the contract by the users involved and/or the respective IT representatives.

In one aspect of the invention, the contract is negotiated for each service use and/or when a service use is changed.

In another aspect of the invention, the contract, following signature, is sent to network operators or the respective IT representatives for implementation of the communication service, and the users are granted the network resources necessary to execute the communication service.

In still another aspect of the invention, the contract, following signature, is sent to the service provider or providers or the respective IT representatives, and the service is made available to the users.

In yet another aspect of the invention, the communication service is an audio telephone service or a video telephone service.

In another aspect of the invention, the communication service is a multimedia service.

BRIEF DESCRIPTION OF THE DRAWINGS

The invention is described below in detail with reference to the drawings, in which:

FIG. 1 shows sending a draft contract for sharing the cost of calls in a first message of a call setup.

DETAILED DESCRIPTION OF THE INVENTION

Service users or their authorized IT representatives (User Agents) negotiate on the allocation of costs for the use of the service and conclude a contract on this subject. This may be done—for example—during the connection setup or when changes are made to the connection. This contract is cryptographically signed by the parties involved and sent to the IT representatives (Billing Agents) of the service providers involved. The service providers check the contract and evaluate it in order to bill for the service used.

In an exemplary embodiment (see, for example, FIG. 1), the A-side User Agent UA (A) sends the B-side (1) a draft contract with one or more proposals (e.g. P and Q) for sharing the cost of calls in the first message of the call setup. This draft contract has been cryptographically signed by the A-side. If there is more than one proposal, the B-side selects one of the proposals offered, attaches the selection to the draft contract, and signs the whole contract. The B-side returns the contract thus completed to the A-side with the next message (2) in the call setup. The User Agents send the signed contracts to the Admission Control Agents ACA of the network operators involved (3*a*, 3*b*). The Admission Control Agents monitor the access to the network resources (e.g. bandwidth, quality of service). Access to the network resources is granted to the users when the service requirement specified in the contract has been authorized by the service providers involved.

Since the network operator does not usually know the service user and his authorization (separation of network operator and service provider), each Admission Control Agent ACA sends the contract to the Billing Agent BA of the service provider of service user A or B for checking (4*a*, 4*b*). The Billing Agents authenticate the service user in each case and check whether the service users are authorized for the requested service.

To do this, a Public Key Infrastructure, such as is currently available, is used in various versions in the prior art. Such methods are included—for example—in Standard X.509 established by the ITU-T (International Telecommunication Union—Telecommunication Sector). These methods are based on a secret key and a corresponding public key. A service user can sign a contract documented in electronic form with his secret key. This signature includes a string that is usually several hundred characters (bytes) long. The authenticity of this electronic signature of a service user may be checked using his public key, which is stored in a database. It is also possible to check whether the signatory is in possession of the secret key, and whether the signed document is authentic i.e. has not been changed since it was signed. The authorization of the service user is then checked with the help of a database belonging to the service provider, in which the authorizations of his service users are stored.

If the A-side and B-side service providers are different, the two Billing Agents notify one another of the result of the other's authorization procedure (5*a*, 5*b*).

The Billing Agents inform the Admission Control Agents ACA of the network operators involved about the reciprocal result of the check, by sending them messages to this effect (6*a*, 6*b*).

It is also possible for messages to be exchanged in the sequence UA<->BA<->ACA as well as UA<->ACA<->BA (as in FIG. 1). In this case, the User Agents send the contracts directly to the Billing Agents, who carry out the above checks and notify the ACA of the result.

If the check is positive for both parties, the ACAs grant the necessary network resources for the services and notify the service users with a message to this effect (7*a*, 7*b*). The subsequent service control can then take place. The details depend on the service in question and the protocols used for the service control. For example, bidirectional audio and video streams may be set up between the service users via an IP network with the quality of service necessary for this service with the help of the Session Initiation Protocol (SIP) and Resource Reservation Protocol (RSVP). These two protocols are stipulated by the IETF (Internet Engineering Task Force) in RFC (Request for Comment) 2543 and RFC 2205. If the check is negative the service request is refused with a message to this effect and network resources are not granted.

Irrespective of how the service operates subsequently, the invention solves both the fee charging problem and the billing problem. By concluding the contract between the service users, it is possible to define which user pays which service provider for which proportion of the service. This means that network operators and service providers involved have the necessary data available in order to share out the income between them, according to bilateral or multilateral agreements.

If the B-side does not wish to accept the proposals included in the draft contract, it may reject the offer from the A-side either absolutely or may itself send the A-side a draft contract with one or more different proposals. The latter procedure by the B-side may be technically implemented, for example, by the B-side sending the A-side an absolute rejection followed immediately by a new draft contract.

The invention claimed is:

1. A method for charging of fees for communication services with several service providers, comprising:
    defining an allocation of costs incurred for use of one of the communication services between the service providers by users involved in the communication service and/or respective IT representatives negotiating a contract for the allocation of the costs;
    documenting the contract in electronic form; and
        cryptographically signing the electronic form of the contract by the users involved and/or respective the IT representatives, wherein
        the contract, following signature, is sent to network operators or the respective IT representatives for implementation of the communication service, and the users are granted the network resources necessary to execute the communication service.

2. The method according to claim 1, wherein the contract is negotiated for each service use and/or when a service use is changed.

3. The method according to claim 1, wherein the contract, following signature, is sent to the service provider or providers or the respective IT representatives, and the service is made available to the users.

4. The method according to claim 1, wherein the communication service is an audio telephone service or a video telephone service.

5. The method according to claim 1, wherein the communication service is a multimedia service.

* * * * *